(12) United States Patent
Liu et al.

(10) Patent No.: US 11,032,391 B2
(45) Date of Patent: Jun. 8, 2021

(54) SOCIAL NETWORK GROUPING METHOD AND SYSTEM, AND COMPUTER STORAGE MEDIUM

(71) Applicant: Tencent Technology (Shenzhen) Company Limited, Shenzhen (CN)

(72) Inventors: Yuewen Liu, Shenzhen (CN); Chuan Chen, Shenzhen (CN); Peng He, Shenzhen (CN); Junming Mai, Shenzhen (CN); Yuhuang Li, Shenzhen (CN); Weihua Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/573,977

(22) Filed: Sep. 17, 2019

(65) Prior Publication Data

US 2020/0014775 A1    Jan. 9, 2020

Related U.S. Application Data

(63) Continuation of application No. 14/541,398, filed on Nov. 14, 2014, now Pat. No. 10,462,253, which is a
(Continued)

(30) Foreign Application Priority Data

May 15, 2012  (CN) .......................... 201210150066.X

(51) Int. Cl.
*G06F 15/16* (2006.01)
*H04L 29/08* (2006.01)
(Continued)

(52) U.S. Cl.
CPC .......... *H04L 67/306* (2013.01); *G06Q 10/00* (2013.01); *G06Q 50/01* (2013.01); *H04L 67/22* (2013.01)

(58) Field of Classification Search
CPC ....... H04L 67/306; H04L 67/22; G06Q 10/00; G06Q 50/01
See application file for complete search history.

(56) References Cited

U.S. PATENT DOCUMENTS 7,749,084 B2 * 7/2010 Reville .................. H04L 67/22
463/42
8,738,634 B1 * 5/2014 Roth ....................... H04L 51/22
707/748
(Continued)

FOREIGN PATENT DOCUMENTS

CN    101799895 A    8/2010
CN    102262681 A    11/2011
(Continued)

OTHER PUBLICATIONS

Tencent Technology, ISR, PCT/CN2013/072946, dated Jun. 27, 2013, 2 pgs.
(Continued)

*Primary Examiner* — Cheikh T Ndiaye
(74) *Attorney, Agent, or Firm* — Morgan, Lewis & Bockius LLP

(57) ABSTRACT

A method, system and computer-readable storage medium for grouping users of an online social network application are provided. The method includes: acquiring friend relation data of a first user, the friend relation data comprising one or more friend nodes; determining a weight of each of the friend nodes based on the friend relation data acquired; forming a first friend circle with a first friend node having a greatest weight among the friend nodes; traversing the friend nodes to find an optimum friend of the first friend circle;
(Continued)

adding the optimum friend into the first friend circle; and repeating the traversing and adding until all optimum friends of the first friend circle are added into the first friend circle. The method determines the weight of each friend node based on the friend relation data and performs grouping by the weights, which is able to conduct as mart grouping with high speed, low throughput, and high efficiency.

20 Claims, 5 Drawing Sheets

Related U.S. Application Data continuation of application No. PCT/CN2013/072946, filed on Mar. 20, 2013.

(51) Int. Cl.
  *G06Q 10/00* (2012.01)
  *G06Q 50/00* (2012.01)

(56) References Cited

U.S. PATENT DOCUMENTS

| | | | |
|---|---|---|---|
| 2008/0086551 A1* | 4/2008 | Moy | G06Q 10/10 709/223 |
| 2008/0189122 A1 | 8/2008 | Coletrane et al. | |
| 2009/0070700 A1* | 3/2009 | Johanson | G06Q 10/10 715/776 |
| 2009/0204908 A1* | 8/2009 | Ganz | G06Q 10/10 715/757 |
| 2009/0271370 A1* | 10/2009 | Jagadish | H04L 51/02 |
| 2010/0057858 A1* | 3/2010 | Shen | G06Q 10/107 709/206 |
| 2010/0191844 A1 | 7/2010 | He et al. | |
| 2012/0015739 A1 | 1/2012 | Craine et al. | |
| 2012/0110678 A1* | 5/2012 | Kumble | G06F 21/10 726/28 |
| 2012/0271722 A1* | 10/2012 | Juan | G06Q 10/04 705/14.72 |
| 2013/0212173 A1* | 8/2013 | Carthcart | G06Q 50/01 709/204 |
| 2015/0379131 A1* | 12/2015 | Gurevich | G06F 16/24578 707/723 |
| 2016/0162601 A1* | 6/2016 | Wohlert | G06F 3/04817 707/748 |

FOREIGN PATENT DOCUMENTS

| | | |
|---|---|---|
| CN | 102316130 A | 1/2012 |
| CN | 102347917 A | 2/2012 |
| CN | 102662964 A | 9/2012 |
| RU | 2433467 C1 | 11/2011 |

OTHER PUBLICATIONS

Tencent Technology, Written Opinion, PCT/CN2013/072946, dated Jun. 27, 2013, 9 pgs.
Tencent Technology, IPRP, PCT/CN2013/072946, dated Nov. 18, 2014, 10 pgs.

* cited by examiner

SOCIAL NETWORK GROUPING METHOD AND SYSTEM, AND COMPUTER STORAGE MEDIUM

CROSS REFERENCE TO RELATED APPLICATIONS

This application is a continuation application of U.S. patent application Ser. No. 14/541,398, entitled "SOCIAL NETWORK GROUPING METHOD AND SYSTEM, AND COMPUTER STORAGE MEDIUM" filed on Nov. 14, 2014, which is a continuation application of International Application No. PCT/CN2013/072946, entitled "SOCIAL NETWORK GROUPING METHOD AND SYSTEM, AND COMPUTER STORAGE MEDIUM" filed on Mar. 20, 2013, which claims priority from Chinese Patent Application No. CN 201210150066.X, filed on May 15, 2012, all of which are hereby incorporated herein in their entireties by reference.

FIELD OF THE TECHNOLOGY

The present disclosure relates generally to the field of Internet communication technology, and more particularly to a method, system, and computer-readable storage medium for social network grouping.

BACKGROUND OF THE DISCLOSURE

With the development of Internet technology, more and more social activities have been transferred to the Internet, including extension of offline social activities on the internet, such as instant messenger products, social networks, etc., as well as social lives in a virtual world, such as online games and so on. Friend management is one of the most fundament and most important function of online social networking, e.g., friend noting, friend grouping, etc. Reasonable friend grouping will enable a user to easily identify and search for friends. Furthermore, reasonable friend grouping plays an even more important role when a user needs to specify different extent of permission to various groups.

Traditional solutions for friend grouping include manual grouping by a user, screening according to key words, and clustering through social networks, etc. Manual grouping by the user is relatively laboursome and, as known by experience in social networks, many users are not enthusiastic about noting and grouping their friends. As a result, it becomes difficult for a user to identify or group a friend as friends accumulate. On the other hand, screening by key words relies on the keywords given by a user to her/his friends, e.g., college, city, and company, etc., which limits the application of this solution to social networks with a real-name system and requires highly accurate key words. Yet in fact, it is almost impossible for virtual social networks, such as instant messenger products, to keep strict conformance in key words. Moreover, since consistent key words are required, it is necessary to pre-define key words, which costs time and labor.

SUMMARY OF THE INVENTION

In view of the above, the present disclosure provides a method, system and computer-readable storage medium for social network grouping which performs quick and smart grouping with low throughput for social network users.

According to one aspect of the disclosure, a method for grouping users of an online social network application is implemented in a social network server having one or more processors and memory storing a plurality of programs, comprising:

acquiring friend relation data of a first user, the friend relation data comprising a plurality of friend nodes;

generating and storing a plurality of friend circles using the friend relation data, wherein each of the friend circles includes a subset of the plurality of friend nodes;

determining a weight of each of the plurality of friend nodes based on the friend relation data;

selecting, among the plurality of friend circles, a first friend circle with a first friend node having a highest weight among the plurality of friend nodes;

traversing the plurality of friend nodes to add an optimum friend to the first friend circle; and repeating the traversing until a first predefined number of optimum friends are added into the first friend circle.

According to another aspect of the disclosure, a computer system includes one or more processors; and memory having instructions stored thereon, the instructions, when executed by the one or more processors, cause the processors to perform the aforementioned method for grouping users of an online social network application.

According to still a further aspect of the disclosure, a non-transitory computer-readable storage medium stores computer executable instructions which, when executed by one or more processors of a computer system, cause the computer system to perform the aforementioned method for grouping users of an online social network application.

According to the disclosure, after the weight of each friend node is determined based on friend relation data, grouping by the weights is performed. Only friends in one friend circle are processed at a time during grouping, which avoids global distance computation and greatly reduces the throughput, so that a smart grouping is conducted with high speed, low throughput, and high efficiency for users of social networks.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
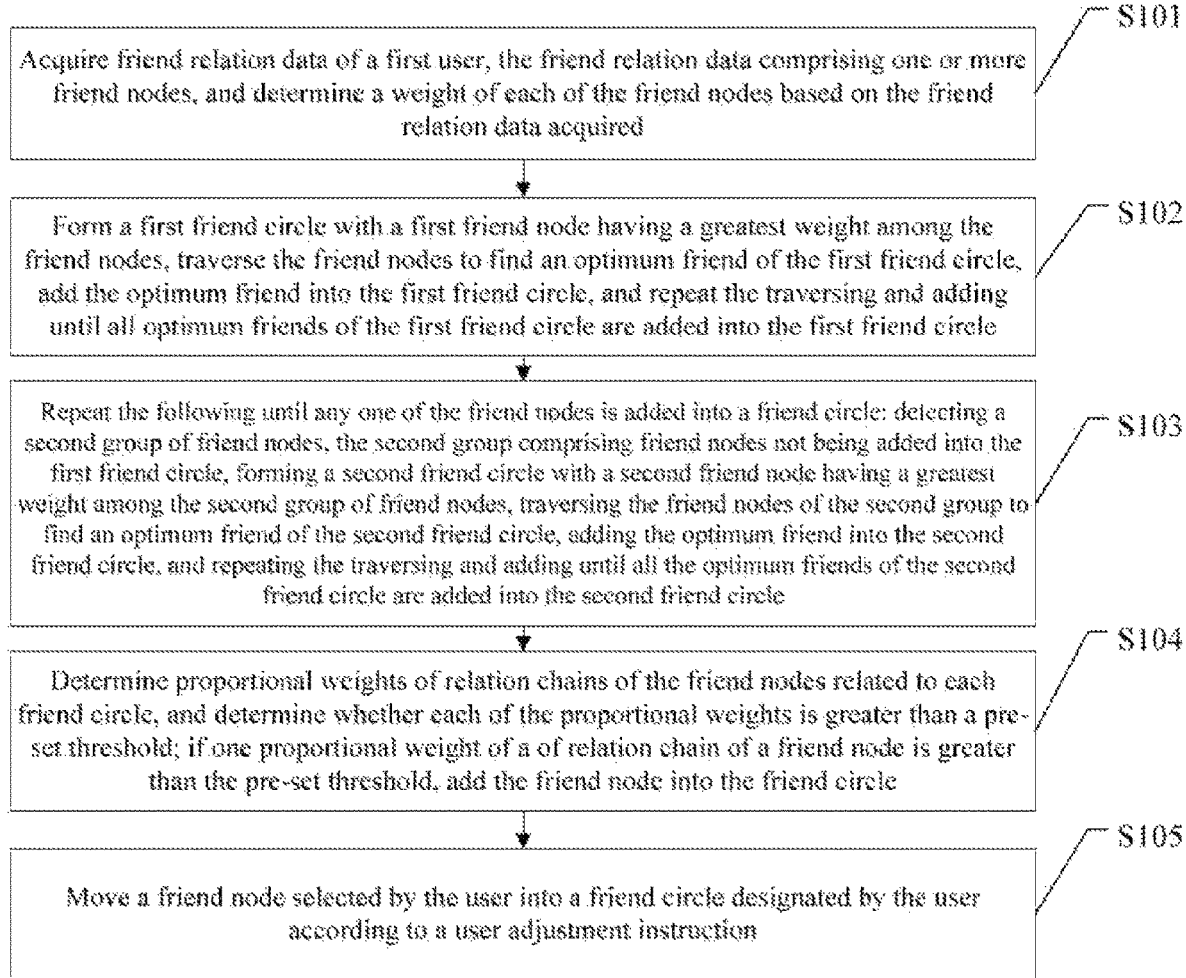
FIG. 1 is a schematic diagram showing a method for social network grouping according to one embodiment of the present disclosure.

FIG. 1 shows a schematic diagram of a method for social network grouping according to an embodiment of the present disclosure. As shown in FIG. 1, the method for social network grouping includes the following steps.

Step S101: acquiring friend relation data of a first user, the friend relation data comprising one or more friend nodes, and determining a weight of each of the friend nodes based on the friend relation data acquired.

Step S102: forming a first friend circle with a first friend node having a greatest weight among the friend nodes, traversing the friend nodes to find an optimum friend of the first friend circle, adding the optimum friend into the first friend circle, and repeating the traversing and adding until all optimum friends of the first friend circle are added into the first friend circle.

In the above embodiment, the weight of each friend node is determined based on the friend relation data, and grouping is then performed according to the weights. In addition, only friends of one friend circle are processed at a time during grouping, which avoids global distance computation and greatly reduced the throughput, so that a smart grouping is conducted quickly, efficiently, and with low throughput for users of social networks.

The embodiment above is described by way of an example of establishing a new friend circle. In practice, following the establishment of a new friend circle, it is possible to have friend nodes remaining outside of any friend circle. Therefore, further grouping can be performed based on the embodiment described above, and another step may be included after Step S102.

Step S103: repeating the following until anyone of the friend nodes is added into a friend circle: detecting a second group of friend nodes, the second group comprising friend nodes not being added into the first friend circle, forming a second friend circle with a second friend node having a greatest weight among the second group of friend nodes, traversing the friend nodes of the second group to find an optimum friend of the second friend circle, adding the optimum friend into the second friend circle, and repeating the traversing and adding until all the optimum friends of the second friend circle are added into the second friend circle. Thus, no friend node is left ungrouped, so that all friend nodes are grouped.

The weight of a friend node mentioned above represents the activeness and closeness of a friend node to other friend nodes, which could be specifically denoted with a certain value. Specifically, the following steps apply when determining the weight of each friend node using friend relation data.

First of all, determine the strength of the relation chains between a friend node and every other friend node.

Then, acquire the weight of the friend node by adding up the strength value of all relation chains related to the friend node.

The strength of relation chain aforementioned represents the extent of closeness, or the strength of the relevance, between two friend nodes. A closer connection between two friend nodes means higher relevance and greater strength value of the corresponding relation chain. On the other hand, less connection between two friend nodes means lower relevance, weaker bond with each other, and lower strength value of the corresponding relation chain.

The strength of the relation chain between two friend nodes can be assessed by a function $w_{ij}=f(\bullet)$, where $w_{ij}$ represents the strength of the relation chain between a friend node i and a friend node j, wherein $w_{ij}=0$ when there is no relation between friend nodes i and j.

The specific form of the function $f(\bullet)$ for $w_{ij}$ calculation can be determined by actual operation environment, such as contact frequency, nature of the relation chain, type and other such parameters. Based on the above definition of relation chain strength, the specific form of the function $f(\bullet)$ is also affected by the closeness between two friend nodes. Take contact frequency for example, the relation chain strength between two friend nodes will increase with the contact frequency. Moreover, if two friend nodes have already added each other as a friend, i.e., they directly connect to each other, then the strength of the corresponding relation chain between them also increases; if two friend nodes connect indirectly (i.e., they do not connect directly but have friend nodes in common), then the strength of the corresponding relation chain will be lower than that when they directly connect. Detailed determination method for relation chain strength is described elsewhere in the disclosure and will not be repeated herein.

After acquiring the strength of the relation chains among friend nodes, the weight of the current friend node can be calculated by adding up the strength of all the relation chains related to the current friend node, as shown in the specific equation below:

$$w_i = \Sigma_j w_{ij}$$

where $w_i$ represents the weight of a friend node i, and $w_{ij}$ represents the relation chain strength between friend nodes i and j.

A friend circle is a group of similar friend nodes, labeled as $C_1, C_2, \cdots C_k \cdots$. If friend node i belongs to friend circle $C_k$, then it is recorded as is $C_k$. If anode does not belong to friend circle $C_k$, but directly connects to a certain friend node within $C_k$, then it is recorded as i~$C_k$. In the present disclosure, all nodes i that satisfies i~$C_k$ are called the friend nodes of friend circle $C_k$.

In the present disclosure, only friends in one friend circle are processed at a time during the grouping of all friend nodes. In addition, the processing of friends in a friend circle is based on optimum friends. The so-called optimum friend, in the present disclosure, means a friend node that, upon joining a friend circle, benefits the maximum increment in friend circle score, wherein the friend circle score can be determined by a ratio of difference between strength summation of relation chains among friend circle member nodes and punishment value of connections outside the friend circle to strength summation of all relation chains related to the friend circle. Therefore, put in a straightforward way, the friend circle score can be determined with the equation below:

Friend circle score=(Intra-friend circle connections-Inter-friend circle connection punishments)/Total connections.

In other words, the friend circle score increases with closer intra-friend circle connections and fewer inter-friend circle connections.

In a specific implementation, the friend circle score $E_k$ of friend circle $C_k$ can be determined using the following equation:

$$E_k = \frac{\sum_{i,j}^{i \in C_k, j \in C_k} w_{ij} - \sum_{j}^{j \sim C_k} \frac{1}{\sum_{i}^{i \in C_k} w_{ij}}}{\sum_{i,j}^{i \in C_k, j \in C_k} w_{ij} + \sum_{j}^{i \in C_k, j \sim C_k} w_{ij}}$$

where $E_k$ represents the friend circle score of friend circle $C_k$, i $\in$ $C_k$ represents that friend node i is a member of friend circle $C_k$, j$\sim$$C_k$ represents that friend node j directly connects to a friend node in friend circle $C_k$, and $w_{ij}$ represents the strength of relation chain between friends nodes i and j.

Accordingly, if the node i is newly added into the friend circle $C_k$, the friend circle score of friend circle $C_k$ will vary, the variation of which can be calculated as:

$$\Delta E_{ki} = E_{ki} - E_k$$

where $E_{ki}$ represents the friend circle score of friend circle $C_k$ after the addition of node i and $\Delta E_{ki}$ represents the variation of the friend circle score of friend circle $C_k$ after the addition of node i.

Suppose that the node i*, of all nodes added into the friend circle $C_k$, satisfies i*$\sim$$C_k$, $\Delta E_{ki}$ being the greatest of all $\Delta E_{ki}$, I$\sim$$C_k$, and $\Delta E_{ki}$>0, then the node i* is named as the optimum friend of friend circle $C_k$.

Figure 2:
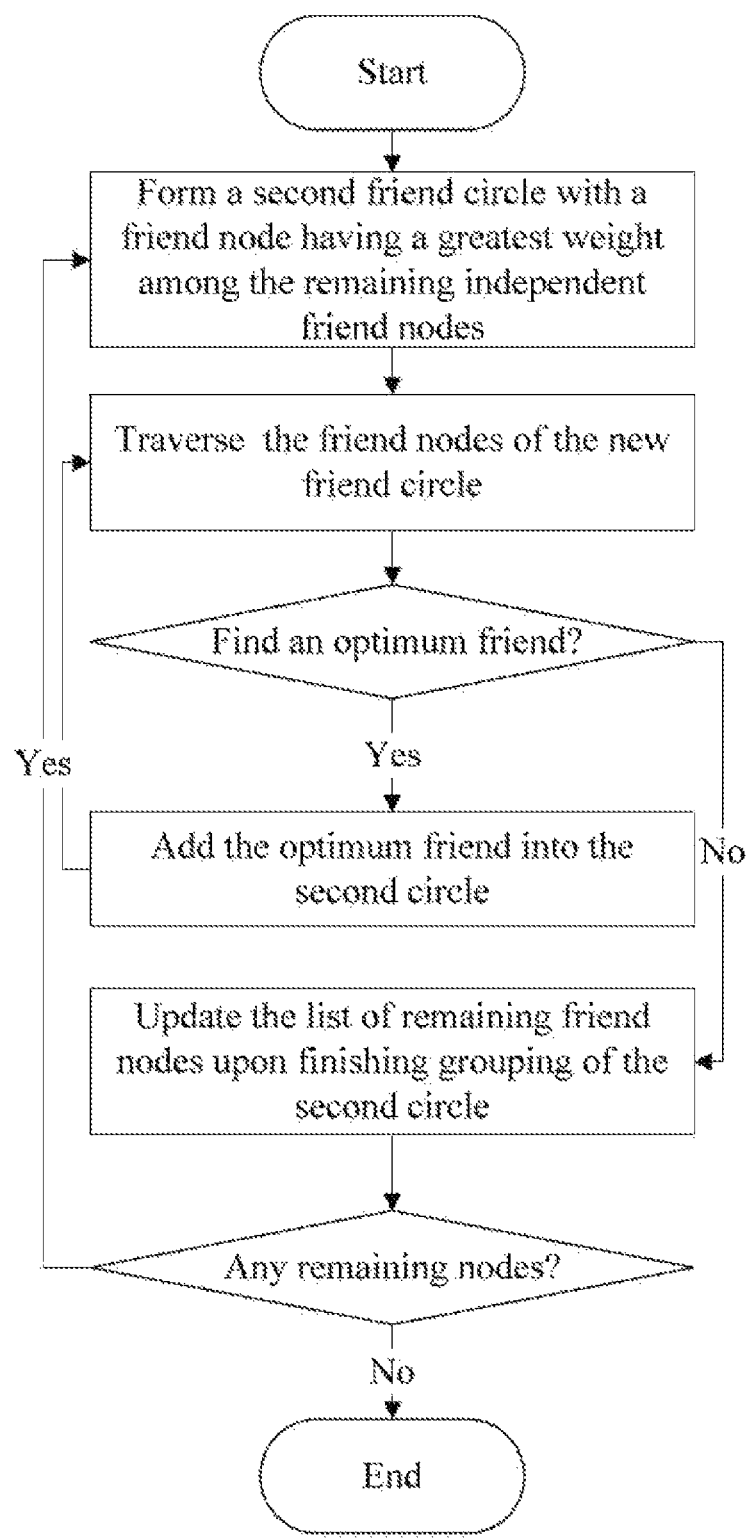
FIG. 2 is a schematic diagram showing friend grouping in a specific example according to one embodiment of the disclosure.

FIG. 2 is a schematic diagram showing friend grouping in a specific example. In this example, the grouping of all friend nodes is described.

As shown in FIG. 2, suppose the initial number of friends is N in a specific example of friend grouping.

At the start of friend grouping, form a first friend circle with a first friend node having a greatest weight.

Afterwards, traverse all the friend nodes of the first friend circle to find an optimum friend, and add it into the first friend circle. Then, traverse all the friend nodes of the first friend circle with the optimum friend added to find another optimum friend, and add it into the first friend circle. And the rest can be done in the same manner, until no optimum friend eligible to be added into the first friend circle is left.

Suppose there are M friend nodes left when the above process is finished. Then, form a second friend circle with a second friend node having a greatest weight among the M friend nodes.

Afterwards, traverse all the friend nodes of the second friend circle to find an optimum friend, and add it into the second friend circle. Then, traverse all the friend nodes of the second new friend circle with the optimum friend added to find another optimum friend, and add it into the second friend circle. And the rest can be done in the same manner, until no optimum friend eligible to be added into the second new friend circle is left.

Repeat the above process until there is no independent node left, or in other words, until every friend node has been sorted to a friend circle.

The grouping method as described above only deals with friend circle friends of one friend circle at a time, which avoids global distance calculation and greatly reduces computational loads, resulting in fast smart grouping for social network users.

Figure 3:
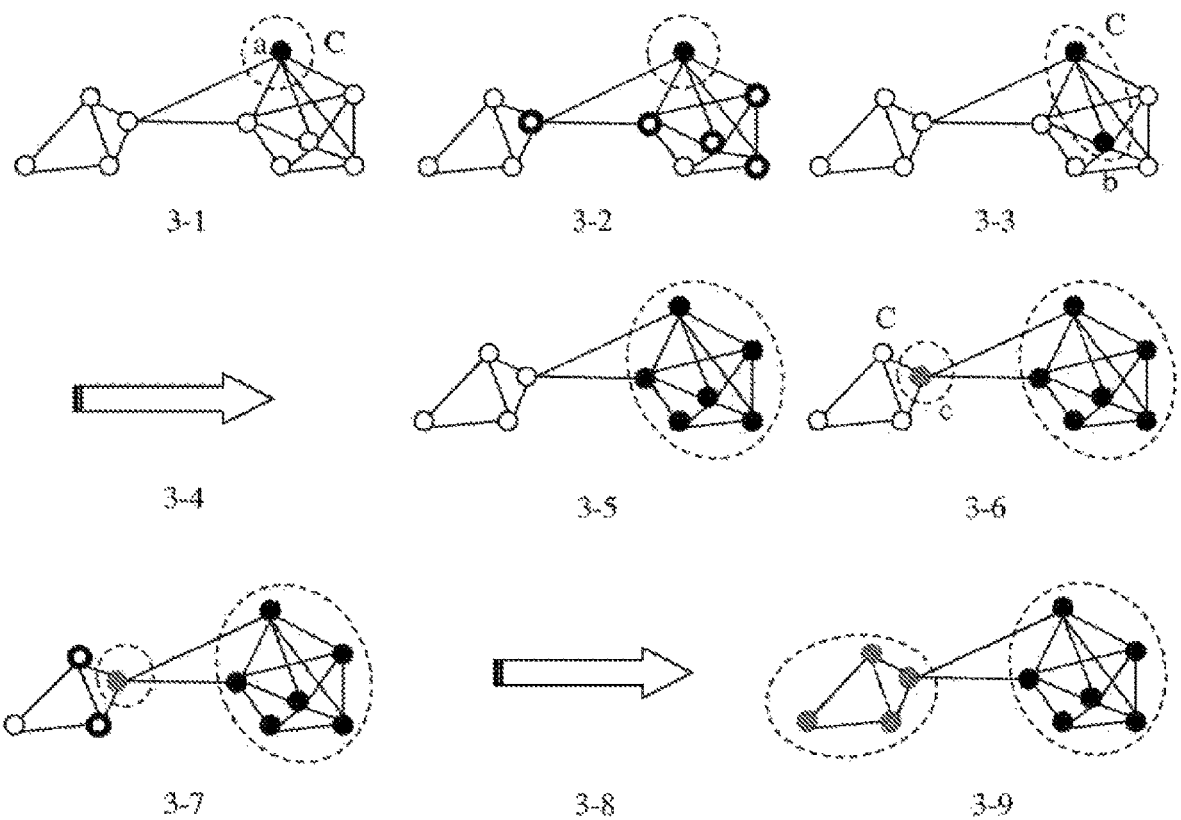
FIG. 3 is a specific example of grouping according to the method of one embodiment of the present disclosure.

As one aspect of the present disclosure, FIG. 3 shows a specific example of grouping which demonstrates the actual process of friend grouping using the methods of the disclosure.

Referring to FIG. 3:

In FIG. 3-1, a node a, which has the greatest weight, forms a friend circle C1.

In FIG. 3-2, all the nodes with direct link to the friend circle C1 are assessed and shown as bold friend circles.

In FIG. 3-3, the optimum friend, b, is selected from all the nodes with direct link to the friend circle C1 and added into the friend circle C1.

Figure 4:
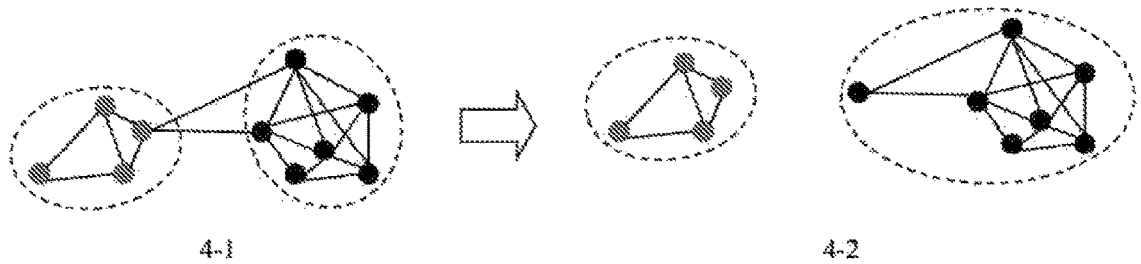
FIG. 4 is a schematic diagram of an example of multiple grouping according to one embodiment of the present disclosure.
Figure 5:
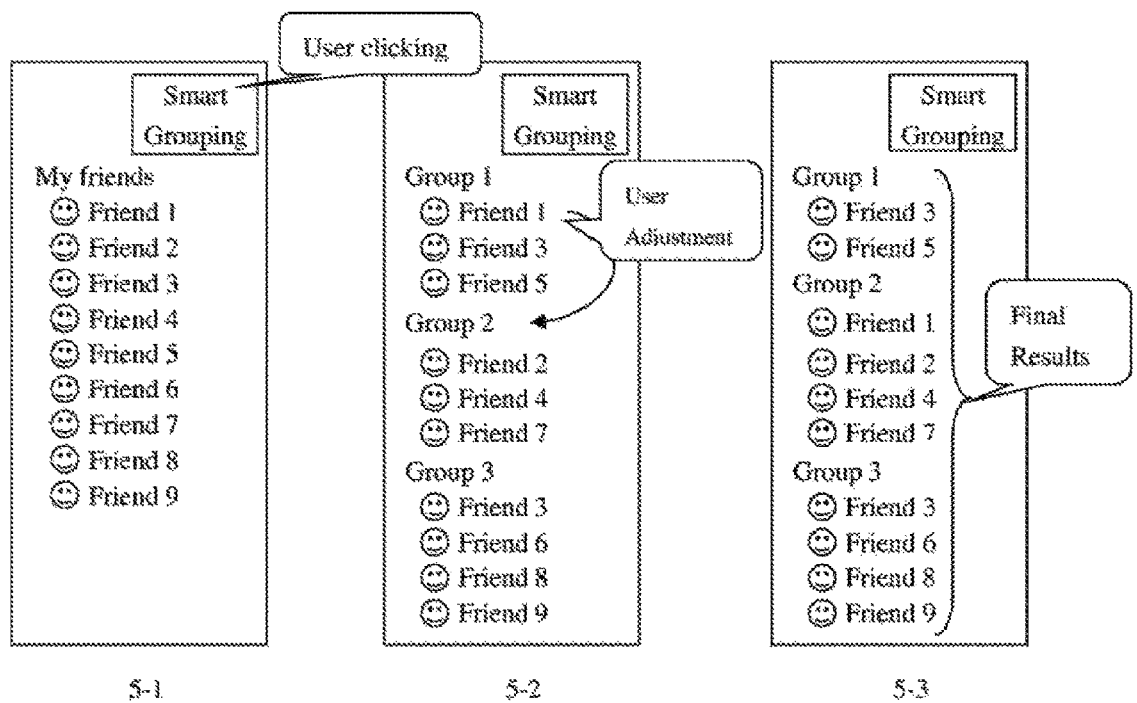
FIG. 5 is a schematic diagram of group editing by user in a specific example according to one embodiment of the disclosure.

In FIG. 3-4, the above steps as shown in FIGS. 3-2 and 3-3 are repeated until no optimum friend is left, i.e., arriving at the situation in FIGS. 3-5.

In FIGS. 3-6, a node c, which has the greatest weight of all remaining nodes, is selected to form a friend circle. The steps above are repeated, as shown in FIG. 3-7, including assessing friends of the new friend circle and adding the optimum friend(s) into the new friend circle until no optimum friend is left. Then the process above is repeated, as shown in FIG. 3-8, until no node is remaining. The final grouping results are shown in FIG. 3-9.

Fast smart grouping of all friend nodes can be achieved by applying the methods of the disclosure as described above. However, under some circumstances, some nodes may belong to multiple friend circles, and thus may be further adjusted by multiple grouping on the basis of the forementioned grouping results. Adjustments of multiple grouping can be determined by the proportional weight of friend relation chains of a node relating to two or more friend circles. Accordingly, the method may include, after step S103, the step of:

Step S104: determining proportional weights of relation chains of the friend nodes related to each friend circle, and determining whether each of the proportional weights is greater than a pre-set threshold; if one proportional weight of relation chain of a friend node is greater than the pre-set threshold, add the friend node into the friend circle.

The aforementioned proportional weight of friend relation chains can be calculated as the proportion of strength value summation of relation chains between the friend node and nodes within the friend circle to the weight of the friend node. In one of the specific implementation, the proportional weight of friend relation chains may be calculated with the equation below:

$$p_{ki} = \frac{\sum_{j}^{j \in C_k} w_{ij}}{\sum_{j} w_{ij}}$$

where $P_{ki}$ the proportional weight of friend circle $C_k$ related-relation chains of friend node i of the friend circle $C_k$, which indicates the proportional weight of relation chains related to friend circle $C_k$ to the total relation chains of friend node i, j$\in$ $C_k$ represents that friend node j is a member of friend circle $C_k$, $w_{ij}$ represents the relation chain strength between friend nodes i and j, and $\Sigma_j w_{ij}$ represents the weight of friend node i.

After $P_{ki}$, the proportional weight of relation chains, has been determined, if $P_{ki}$ is greater than a preset threshold, then it may be concluded that the friend node i may belong to the friend circle $C_k$. Then friend node i may be added into the friend circle $C_k$. FIG. 4 demonstrates the results of performing multiple grouping on the grouping results as in FIG. 3. FIG. 4-1 shows the grouping results from the example of FIG. 3, and FIG. 4-2 shows, after multiple grouping of the results, a friend node in the left friend circle has been also grouped to the right friend circle.

After the grouping results have been acquired as in Step S103, or after the multiple grouping results have been acquired as in Step S104, the users can adjust the results according to their needs and complete the final grouping. In other words, the method can further include, following the aforementioned Step S103 or S104, the step of:

Step S105: moving a friend node selected by the user into a friend circle designated by the user according to a user adjustment instruction.

FIG. 5 shows a specific example where the grouping results are adjusted by a user. There are nine friend nodes in total before grouping, as shown in FIG. 5-1, which are then grouped as described above and generate the grouping results as in FIG. 5-2. As shown in FIG. 5-2, Friend 3 is grouped into Group 1 and Group 3 at the same time after multiple grouping. The user may make adjustments to the results as shown in FIG. 5-2, reassigning Friend 1 from Group 1 to Group 2 to reach the final grouping results as shown in FIG. 5-3.

After the final grouping results have been reached, the final grouping results may be stored in a grouping results database, so that the results may be read directly during the following user login instead of being grouped repeatedly. The detailed process is described else wherein the disclosure and will not be repeated here.

Figure 6:
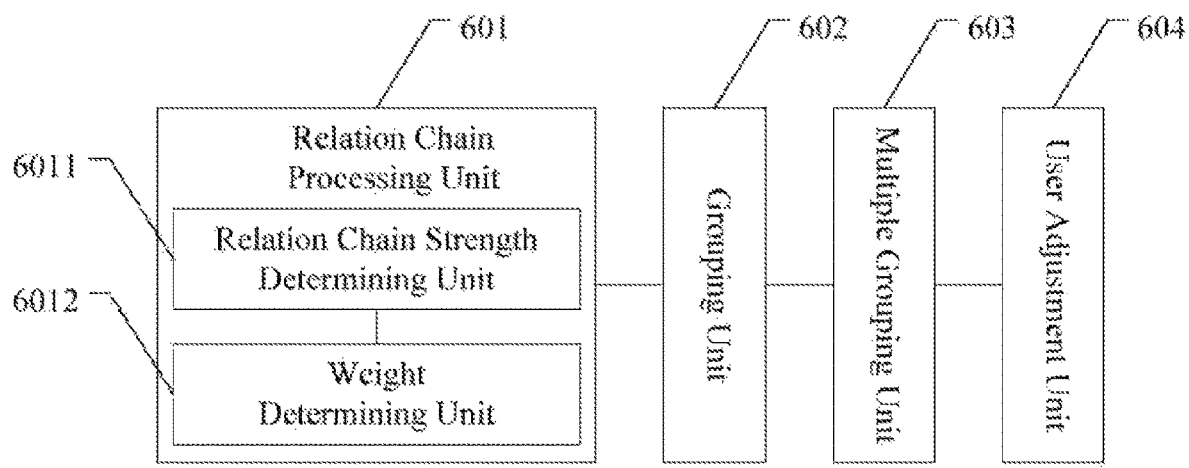
FIG. 6 is a structural schematic diagram of a system for social network grouping according to one embodiment of the present disclosure.

A system for social network grouping based on the methods of the disclosure is also provided. FIG. 6 is a structural schematic diagram of a system for social network grouping according to an embodiment of the present disclosure.

As shown by FIG. 6, the system for social network grouping in the embodiment herein includes:

a relation chain processing unit 601, configured to acquire friend relation data of a first user, the friend relation data comprising one or more friend nodes, and determine a weight of each of the friend nodes based on the friend relation data acquired; and a grouping unit 602, configured to form a first friend circle with a first friend node having a greatest weight among the friend nodes, traverse the friend nodes to find an optimum friend of the first friend circle, add the optimum friend into the first friend circle, and repeat the traversing and adding until all the optimum friends of the first friend circle are added into the first friend circled.

In the above embodiment of the present disclosure, the grouping is performed according to the weights of the friend nodes upon determining the weight for each friend node based on the friend relation data, and only friend circle friends of one friend circle are handled at a time during grouping, which avoids global distance calculation and greatly reduces computational loads, enabling fast smart grouping for social network users with low throughput and high efficiency.

The embodiment above is illustrated by way of an example, by which a first friend circle is established. In practice, after the establishment of the first friend circle, there may still be friend nodes remaining outside of the first friend circle. Thus, further grouping maybe performed on this basis, as described in the embodiment above.

The grouping unit 602, as described above, may be further configured to detect a second group of friend nodes comprising friend nodes not being added into the first circle, form a second friend circle with a second friend node having a greatest weight among the second group of friend nodes, traverse the friend nodes of second group to find an optimum friend of the second friend circle, add the optimum friend into the second friend circle, and repeat the traversing and adding until all the optimum friends of the second friend circle are added into the second circle and any one of the friend nodes is added into a friend circle.

In one implementation, the fore-mentioned relation chain processing unit 601 may include:

a relation chain strength determining unit 6011, configured to determine strength value of relation chains between each two friend nodes; and a weight determining unit 6012, configured to add up the strength value of all relation chains between a friend node and any friend nodes that are in connection relation with the friend node to obtain the weight of the friend node.

The strength of relation chain aforementioned represents the extent of closeness, or the strength of the relevance, between two friend nodes. A closer connection between two friend nodes means higher relevance and greater strength value of the corresponding relation chain. On the other hand, less connection between two friend nodes means lower relevance, weaker bond with each other, and lower strength value of the corresponding relation chain.

The optimum friend, as mentioned in the grouping process using the grouping unit 602 in one implementation, refers to a friend node, of all friend nodes of a friend circle, which benefits the maximum increment in the friend circle score upon joining the friend circle. The friend circle score may be determined a ratio of difference between strength summation of relation chains among friend circle member nodes and punishment value of connections outside the friend circle to strength summation of all relation chains related to the friend circle. In one implementation, the friend circle score may be determined by the grouping unit 602 using the following equation:

$$E_k = \frac{\sum_{i,j}^{i \in C_k, j \in C_k} w_{ij} - \sum_{j}^{j \sim C_k} \frac{1}{\sum_{i}^{i \in C_k} w_{ij}}}{\sum_{i,j}^{i \in C_k, j \in C_k} w_{ij} + \sum_{j}^{i \in C_k, j \sim C_k} w_{ij}}$$

where $E_k$ represents friend circle score, $i \in C_k$ represents that friend node i is a member of friend circle $C_k$, $j \sim C_k$ represents that friend node j directly links to anode in friend circle $C_k$, and $w_{ij}$ represents the relation chain strength between friend nodes i and j.

In some cases, a friend node may belong to multiple friend circles at the same time. Therefore, adjustments may be performed on the grouping results above using multiple grouping. Adjustments of multiple grouping can be determined by the proportional weight of friend relation chains of a node in two or more friend circles. In other words, the system for social network grouping of the disclosure may further include:

a multiple grouping unit 603, connected to the aforementioned grouping unit 602, configured to determine proportional weights of relation chains of the friend nodes related to each friend circle, and determine whether each of the proportional weights is greater than a pre-set threshold; if one proportional weight of relation chain of a friend node is greater than the pre-set threshold, add the friend node into the friend circle.

The aforementioned proportional weight of friend relation chains can be calculated as the proportion of strength value summation of relation chains between the friend node and nodes within the friend circle to the weight of the friend node. In one implementation, the proportional weight of friend relation chains may be calculated with the equation below:

$$p_{ki} = \frac{\sum_{j}^{j \in C_k} w_{ij}}{\sum_{j} w_{ij}}$$

where $P_{ki}$ represents the proportional weight of friend node i in its relation chains related to friend circle $C_k$, $j \in C_k$ represents that friend node j is a member of friend circle $C_k$, $w_{ij}$ represents the relation chain strength between nodes i and j, and $\Sigma_j w_{ij}$ represents the weight of friend node i.

After the grouping results have been acquired from the grouping unit 602, or after the multiple grouping results have been acquired from the multiple grouping unit 603, the users can adjust the results according to their needs and complete the final grouping. In other words, the system for social network grouping can further include:

a user adjustment unit 604, configured to move a friend node selected by the user into a friend circle designated by the user according to a user adjustment instruction.

In the system for social network grouping of the disclosure, as described above, the specific way for determining weights of friend nodes, grouping, multiple grouping, user adjustment, and so on, may be equivalent to the methods for social network grouping of the disclosure, which are described previously and not repeated here.

It should be noted that for a person skilled in the art, partial or full process to realize the methods in the above embodiments can be accomplished by related hardware instructed by a computer program, the program can be stored in a computer readable storage medium and the program can include the process of the embodiments of the above methods. The storage medium can be a disk, a light disk, a Read-Only Memory or a Random Access Memory, etc.

The methods of the disclosure, as described in the above embodiments, may be in the form of computer software installed on designated equipment, and, when activated, complete the fore-mentioned grouping process by manipulating relevant processing equipment. For the system for social network grouping of the disclosure, FIG. 7 and FIG. 8 depicts two exemplary environments incorporating exemplary systems for social network grouping in accordance with various disclosed embodiments, respectively.

Figure 7:
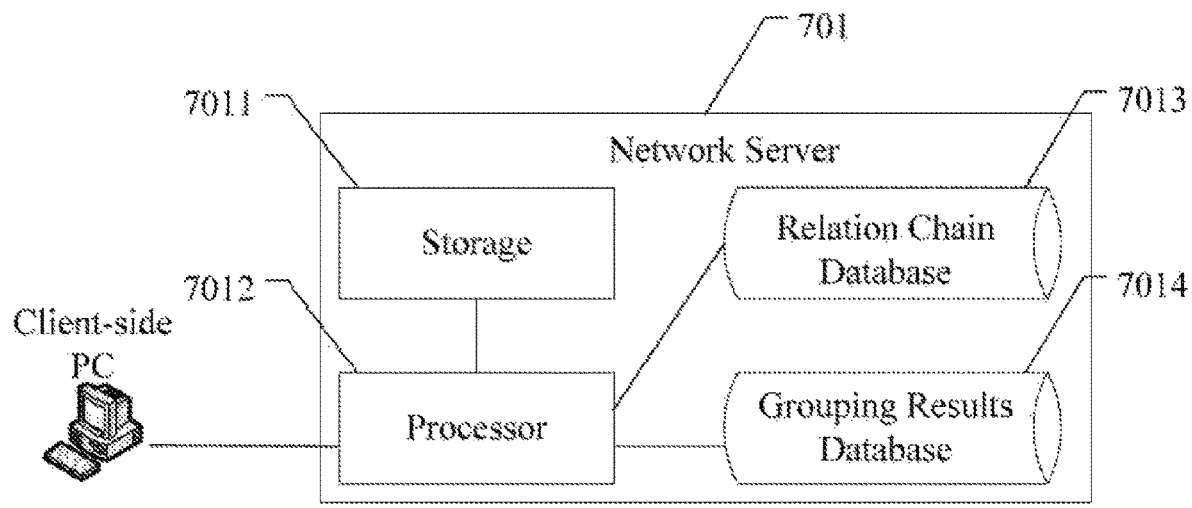
FIG. 7 is s schematic diagram of an operating environment of a system according to one embodiment of the present disclosure.

Referring to FIG. 7, the social network grouping is carried out by a network server 701 that provides internet social services. The network server 701 includes a storage 7011 for storing the software corresponding to the system for social network grouping, and a processor 7012 for carrying out the processing procedure of the software. As shown in FIG. 7, the network server 701 further includes a relation chain database 7013 to provide friend relation data, and a grouping results database 7014 to store the results of social network grouping generated by the methods of the present disclosure. In fact, the locations of the relation chain database 7013 and grouping results database 7014 may vary as desired, or be separately located on other servers, as long as friend relation data can be retrieved from the relation chain database 7013 and grouping results can be stored in the grouping results database 7014.

Accordingly, in practice, the methods of the present disclosure maybe stored in the storage 7011 of the network server 701 as a software program. When running, the program executes the social network grouping procedure by manipulating the processor 7012 as described above. The grouping results generated by the processor 7012 may be sent to a client PC for browsing and conveniently adjusted by the user. The final grouping results may be sent to the grouping results database 7014 for storage. The storage 7011 herein may be, e.g., a hard drive, a chip, a disk, or any other storage device capable of storing computer program software, as long as it may function to store of the program software. The processor 7012 herein may be, e.g., CPU, or other devices capable of running a program software and executing relevant processing. FIG. 7 is meant to illustrate by way of example, wherein the client PC being a displayer to the user. In practice, the client may also be any other device capable of interacting with the user, such as a PDA, a tablet PC, a laptop, a smartphone, and so on.

Figure 8:
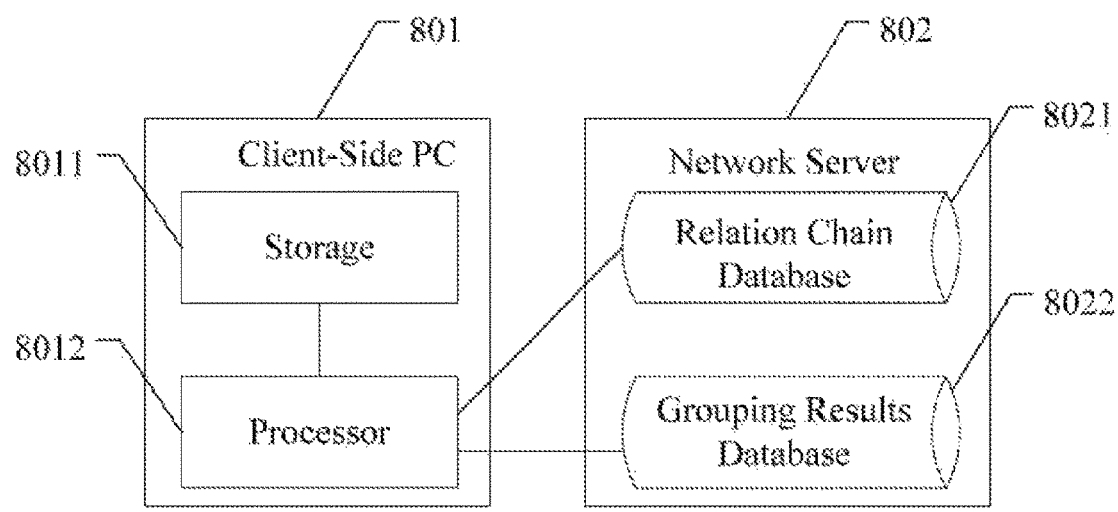
FIG. 8 is a schematic diagram of an operating environment of a system according to another embodiment of the present disclosure.

Referring to FIG. 8, the social network grouping is carried out by a client PC 801 that interacts with the user. The client PC 801 includes a storage 8011 for storing the software corresponding to the system for social network grouping, and a processor 8012 for executing the processing procedure in the software.

FIG. 8 also shows a network server 802, which further includes a relation chain database 8021 for providing friend relation data, and a grouping results database 8022 for storing the results of social network grouping generated by the methods of the disclosure. In fact, the relation china database 8021 and the grouping results database 8022 maybe located anywhere as desired, or separately on any other servers, as long as friend relation data can be provided by the relation chain database 8021 and the grouping results can be stored in the grouping results database 8022.

Accordingly, in practice, the methods of the present disclosure maybe stored in the storage 8011 of the client PC 801 as a software program. When running, the software program executes the social network grouping procedure by manipulating the processor 8012 as described above. The grouping results generated by the processor 8012 may be directly browsed and conveniently adjusted by the user. The final grouping results may be sent to the grouping results database 8022 for storage. The storage 8011 herein may be, e.g., a hard drive, a chip, a disk, or any other storage device capable of storing computer program software, as long as it may function to store of the program software. The processor 8012 herein may be, e.g., CPU, or other device capable of running a program software and executing relevant processing.

FIG. 8 means to illustrate by way of an example, wherein the system of the disclosure is installed in the client PC. In practice, the system may also be installed in any other device that may interact with the user, such as a PDA, a tablet PC, a laptop, a smart phone, etc.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for grouping friends of a first user of an online social network application implemented in a server having one or more processors and memory storing a plurality of programs, the method comprising:
    acquiring friend relation data corresponding to a plurality of friends of the first user of the social networking application, wherein each of the plurality of friends is an existing contact of the first user on the social networking application, the friend relation data represents connections in-between the plurality of friends on the social networking application, and each of the plurality of friends corresponds to a respective friend node of a plurality of friend nodes on the social network application;
    generating and storing a plurality of friend circles using the friend relation data, wherein each of the friend circles is a respective subset of the plurality of friends of the first user and includes a respective subset of the plurality of friend nodes;
    determining a weight of each of the plurality of friend nodes based on the friend relation data;
    selecting, among the plurality of friend circles, a first friend circle with a first friend node having a highest weight among the plurality of friend nodes;
    traversing the plurality of friend nodes to add an optimum friend to the first friend circle, wherein the optimum friend corresponds to a friend node of the plurality of friend nodes; and
    repeating the traversing until a first predefined number of optimum friends are added into the first friend circle.

2. The method according to claim 1, further comprising:
    selecting, among the plurality of friend nodes, a second group of friend nodes, the second group comprising friend nodes not being added into the first friend circle;
    selecting, among the plurality of friend circles, a second friend circle with a second friend node having a highest weight among the second group of friend nodes;
    traversing the plurality of friend nodes of the second group to add an optimum friend to the second friend circle; and
    repeating the traversing until a second predefined number of optimum friends are added into the second friend circle.

3. The method according to claim 2, further comprising:
    receiving a first input from a client device to move a first friend from the second friend circle to the first friend circle; and
    responsive to the received input and in accordance with a determination that the first friend is not already in the first friend circle:
        updating the stored first friend circle and the second friend circle; and
        sending, to the client device, an updated view including a modified first subset of friends and a modified second subset of friends, wherein the modified first subset of friends includes the first friend and the modified second subset of friends excludes the first friend.

4. The method according to claim 1, further comprising:
    determining proportional weights of relation chains of the plurality of friend nodes related to each friend circle, and
    determining whether each of the proportional weights is greater than a pre-set threshold; and
    in accordance with a determination that one proportional weight of relation chain of a friend node is greater than the pre-set threshold, adding the friend node into the friend circle.

5. The method according to claim 4, wherein the proportional weight of the relation chain of the friend node related to each friend circle is determined by the proportion of strength value summation of relation chains between the friend node and nodes within the friend circle to the weight of the friend node.

6. The method according to claim 1, wherein the addition of the optimum friend to the first friend circle causes a maximum increment to a friend circle score of the first friend circle.

7. The method according to claim 6, wherein the first friend circle score is determined by a ratio of difference between strength summation of relation chains among nodes in the first friend circle and punishment value of connections outside the first friend circle to strength summation of all relation chains related to the first friend circle.

8. The method according to claim 1, wherein the determining further comprises:
    determining strength value of relation chains between each two friend nodes; and
    adding up the strength value of all relation chains between a friend node and any friend nodes that are in connection relation with the friend node to obtain the weight of the friend node.

9. A computer system for grouping friends of a first user of an online social network application, comprising:
    one or more processors; and
    memory having instructions stored thereon, the instructions, when executed by the one or more processors, cause the processors to perform operations including:
        acquiring friend relation data corresponding to a plurality of friends of the first user of the social networking application, wherein each of the plurality of friends is an existing contact of the first user on the social networking application, the friend relation data represents connections in-between the plurality of friends on the social networking application, and each of the plurality of friends corresponds to a respective friend node of a plurality of friend nodes on the social network application;
        generating and storing a plurality of friend circles using the friend relation data, wherein each of the friend circles is a respective subset of the plurality of friends of the first user and includes a respective subset of the plurality of friend nodes;
        determining a weight of each of the plurality of friend nodes based on the friend relation data;
        selecting, among the plurality of friend circles, a first friend circle with a first friend node having a highest weight among the plurality of friend nodes;
        traversing the plurality of friend nodes to add an optimum friend to the first friend circle, wherein the optimum friend corresponds to a friend node of the plurality of friend nodes; and
        repeating the traversing until a first predefined number of optimum friends are added into the first friend circle.

10. The computer system according to claim 9, wherein the operations further comprise:

selecting, among the plurality of friend nodes, a second group of friend nodes, the second group comprising friend nodes not being added into the first friend circle;

selecting, among the plurality of friend circles, a second friend circle with a second friend node having a highest weight among the second group of friend nodes;

traversing the plurality of friend nodes of the second group to add an optimum friend to the second friend circle; and repeating the traversing until a second predefined number of optimum friends are added into the second friend circle.

11. The computer system according to claim 10, wherein the operations further comprise:

receiving a first input from a client device to move a first friend from the second friend circle to the first friend circle; and responsive to the received input and in accordance with a determination that the first friend is not already in the first friend circle:

updating the stored first friend circle and the second friend circle; and sending, to the client device, an updated view including a modified first subset of friends and a modified second subset of friends, wherein the modified first subset of friends includes the first friend and the modified second subset of friends excludes the first friend.

12. The computer system according to claim 9, wherein the operations further comprise:

determining proportional weights of relation chains of the plurality of friend nodes related to each friend circle, and determining whether each of the proportional weights is greater than a pre-set threshold; and in accordance with a determination that one proportional weight of relation chain of a friend node is greater than the pre-set threshold, adding the friend node into the friend circle.

13. The computer system according to claim 9, wherein the addition of the optimum friend to the first friend circle causes a maximum increment to a friend circle score of the first friend circle.

14. The computer system according to claim 9, wherein the determining further comprises:

determining strength value of relation chains between each two friend nodes; and adding up the strength value of all relation chains between a friend node and any friend nodes that are in connection relation with the friend node to obtain the weight of the friend node.

15. A non-transitory computer-readable storage medium storing computer executable instructions for grouping friends of a first user of an online social network application which, when executed by one or more processors of a computer system, cause the computer system to perform operations comprising:

acquiring friend relation data corresponding to a plurality of friends of the first user of the social networking application, wherein each of the plurality of friends is an existing contact of the first user on the social networking application, the friend relation data represents connections in-between the plurality of friends on the social networking application, and each of the plurality of friends corresponds to a respective friend node of a plurality of friend nodes on the social network application;

generating and storing a plurality of friend circles using the friend relation data, wherein each of the friend circles is a respective subset of the plurality of friends of the first user and includes a respective subset of the plurality of friend nodes;

determining a weight of each of the plurality of friend nodes based on the friend relation data;

selecting, among the plurality of friend circles, a first friend circle with a first friend node having a highest weight among the plurality of friend nodes;

traversing the plurality of friend nodes to add an optimum friend to the first friend circle, wherein the optimum friend corresponds to a friend node of the plurality of friend nodes; and repeating the traversing until a first predefined number of optimum friends are added into the first friend circle.

16. The non-transitory computer-readable storage medium according to claim 15, wherein the operations further comprise:

selecting, among the plurality of friend nodes, a second group of friend nodes, the second group comprising friend nodes not being added into the first friend circle;

selecting, among the plurality of friend circles, a second friend circle with a second friend node having a highest weight among the second group of friend nodes;

traversing the plurality of friend nodes of the second group to add an optimum friend to the second friend circle; and repeating the traversing until a second predefined number of optimum friends are added into the second friend circle.

17. The non-transitory computer-readable storage medium according to claim 16, wherein the operations further comprise:

receiving a first input from a client device to move a first friend from the second friend circle to the first friend circle; and responsive to the received input and in accordance with a determination that the first friend is not already in the first friend circle:

updating the stored first friend circle and the second friend circle; and sending, to the client device, an updated view including a modified first subset of friends and a modified second subset of friends, wherein the modified first subset of friends includes the first friend and the modified second subset of friends excludes the first friend.

18. The non-transitory computer-readable storage medium according to claim 15, wherein the operations further comprise:

determining proportional weights of relation chains of the plurality of friend nodes related to each friend circle, and determining whether each of the proportional weights is greater than a pre-set threshold; and in accordance with a determination that one proportional weight of relation chain of a friend node is greater than the pre-set threshold, adding the friend node into the friend circle.

19. The non-transitory computer-readable storage medium according to claim 15, wherein the addition of the optimum friend to the first friend circle causes a maximum increment to a friend circle score of the first friend circle.

20. The non-transitory computer-readable storage medium according to claim 15, wherein the determining further comprises:

determining strength value of relation chains between each two friend nodes; and adding up the strength value of all relation chains between a friend node and any friend nodes that are in connection relation with the friend node to obtain the weight of the friend node.

\* \* \* \* \*